United States Patent
Gardner, II

(10) Patent No.: US 11,440,145 B2
(45) Date of Patent: Sep. 13, 2022

(54) DISK STACK REPAIR INSERT

(71) Applicant: ASC Engineered Solutions, LLC, Exeter, NH (US)

(72) Inventor: Phillip Edwin Gardner, II, Holmdel, NJ (US)

(73) Assignee: ASC Engineered Solutions, LLC, Exeter, NH (US)

( * ) Notice: Subject to any disclaimer, the term of this patent is extended or adjusted under 35 U.S.C. 154(b) by 109 days.

(21) Appl. No.: 16/797,763

(22) Filed: Feb. 21, 2020

(65) Prior Publication Data

US 2021/0260705 A1 Aug. 26, 2021

(51) Int. Cl.
*F16K 47/08* (2006.01)
*B23P 6/04* (2006.01)
*B23K 31/02* (2006.01)

(52) U.S. Cl.
CPC .............. *B23P 6/04* (2013.01); *B23K 31/02* (2013.01); *F16K 47/08* (2013.01); *Y10T 137/86791* (2015.04)

(58) Field of Classification Search
CPC ... F16K 3/24; F16K 3/246; F16K 3/32; F16K 3/34; F16K 47/08; F16K 47/14; Y10T 137/0491; Y10T 137/0502; Y10T 137/0514; Y10T 137/0486; Y10T 137/0441; Y10T 137/86791
See application file for complete search history.

(56) References Cited

U.S. PATENT DOCUMENTS

| 4,593,446 A * | 6/1986 | Hayner ................... F16K 47/08 137/625.28 |
| 5,390,896 A * | 2/1995 | Smirl ...................... F16K 47/08 137/625.3 |
| 5,937,901 A * | 8/1999 | Bey ....................... F16K 47/045 137/625.32 |
| 10,655,738 B2 * | 5/2020 | McCaskill .............. F16K 3/246 |

* cited by examiner

*Primary Examiner* — Hailey K. Do
(74) *Attorney, Agent, or Firm* — Taylor English Duma LLP

(57) ABSTRACT

Example aspects of a disk stack repair insert, a repaired disk stack, and a method for repairing a disk stack are disclosed. The disk stack repair insert can comprise a first replacement disk segment defining a first groove pattern comprising first grooves; and a second replacement disk segment defining a second groove pattern comprising second grooves, the first replacement disk segment coupled to the second replacement disk segment, wherein the first groove pattern and the second groove pattern define a fluid passageway therebetween.

13 Claims, 8 Drawing Sheets

DISK STACK REPAIR INSERT

TECHNICAL FIELD

This disclosure relates to valves. More specifically, this disclosure relates to a disk stack repair insert for repairing a damaged disk stack.

BACKGROUND

Disk stacks are commonly used with control valves in power plants, such as coal and nuclear plants, to dissipate pressure and/or heat of steam exiting boilers of the power plant. Disk stacks typically comprise a plurality of disks defining grooves formed therein, which can form fluid passageways around and between the disks from a center bore through the disk stack to an outer surface of the disk stack. As steam or other fluid flows outward through the fluid passageways from the center bore, the pressure and heat of the steam or other fluid can be significantly reduced due to spreading of the fluid in multiple directions by multiple fluid passageways. Additionally, the fluid passageways can each individually define a plurality of turns from within the disk stack to outside of the disk stack to further assist in lowering and dissipating pressure and heat. However, fluid entering the disk stack at a high pressure can cause damage to the disk stack. Often, entire disk stacks must be replaced to ensure proper operation of the disk stack after damage has occurred.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a disk stack repair insert comprising a first replacement disk segment defining a first groove pattern comprising first grooves; and a second replacement disk segment defining a second groove pattern comprising second grooves, the first replacement disk segment coupled to the second replacement disk segment, wherein the first groove pattern and the second groove pattern define a fluid passageway therebetween.

Also disclosed is a repaired disk stack comprising a disk stack comprising a plurality of original disks joined together in a stacked configuration, a first fluid passageway formed between a pair of adjacent original disks, an insert opening formed through the disk stack; and a disk stack repair insert positioned in the insert opening, the disk stack repair insert comprising a plurality of replacement disk segments, a second fluid passageway formed between a pair of adjacent replacement disk segments.

A method for repairing a disk stack is also disclosed, the method comprising providing a disk stack comprising a plurality of original disks, each of the original disks defining a groove pattern, the disk stack having a damaged region; removing the damaged region from the disk stack to define an insert opening in the disk stack; providing a disk stack repair insert comprising a replacement disk segment; and inserting the disk stack repair insert into the insert opening to repair the damaged region.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
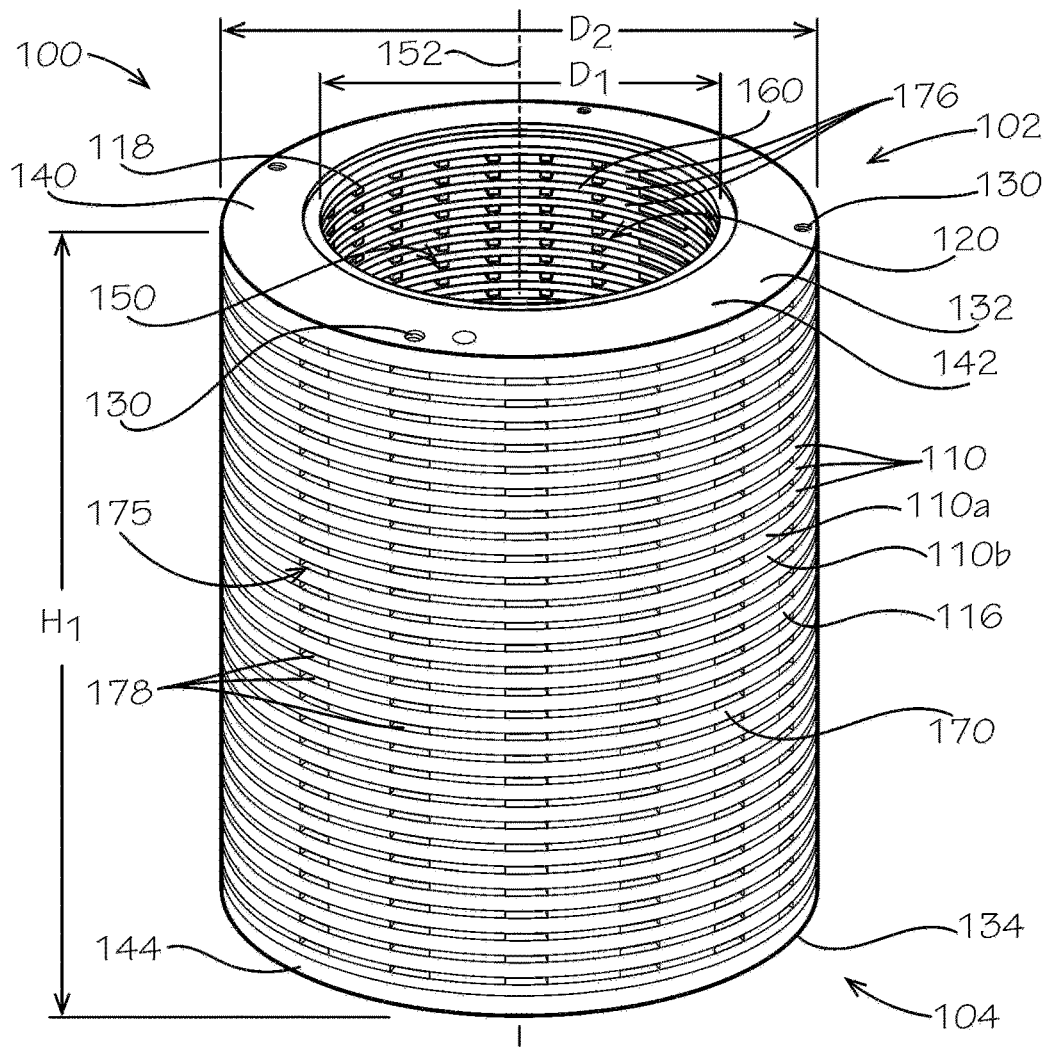
FIG. 1A is a perspective view of a disk stack, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a disk stack repair insert for a disk stack and associated methods, systems, devices, and various apparatus. Example aspects of the disk stack can comprise a plurality of replacement disk segments arranged in series and at least one pin extending through the plurality of replacement disk segments. It would be understood by one of skill in the art that the disclosed disk stack repair insert is described in but a few exemplary aspects among many. No particular terminology or description should be considered limiting on the disclosure or the scope of any claims issuing therefrom.

FIG. 1A illustrates a first aspect of a disk stack 100 according to the present disclosure. According to example aspects, the disk stack 100 can be utilized within a fluid system. For example, the disk stack 100 can be coupled with a valve (not shown) and can be configured reduce the pressure of a fluid (e.g., a gas such as steam, a liquid such as water, etc) as it flows through fluid passageways 175 formed in the disk stack 100, as described in further detail below. As shown, the disk stack 100 can comprise a plurality of original disks 110 stacked in series to define a substantially cylindrical structure. For example, the original disks 110 can be stacked in a substantially vertical arrangement, relative to the orientation shown. In some aspects, each of the original disks 110 can joined to adjacent original disks 110 by a brazing process, for example. Brazing can comprise inserting a filler material between a pair of adjacent original disks 110 and allowing the filler material to cool therebetween, coupling the adjacent original disks 110 together. In other aspects, however, adjacent original disks 110 can be coupled together by any other suitable fasteners, such as, for example, welding, bolts, screws, or the like. Furthermore, the disk stack 100 can comprise a plurality of fastener openings 130 configured to receive fasteners (not shown) for coupling the disk stack 100 to the valve or other element of the fluid system.

Example aspects of the disk stack 100 can define a top end 132 (e.g., a plugged end 102) and a bottom end 134 (e.g., an inlet end 104), relative to the orientation shown, and can define a height $H_1$. In the present aspect, the disk stack 100 can comprise a top disk cap 140 positioned at the top end 132 thereof, which can define a substantially smooth upper disk cap surface 142. Furthermore, the disk stack 100 can comprise a bottom disk cap 144 positioned at the bottom end 134 thereof, which can define a substantially smooth lower disk cap surface (not shown). The plurality of original disks 110 can be stacked between the top disk cap 140 and bottom disk cap 144, as shown. According to example aspects, each of the original disks 110 can be substantially flat and can define an upper disk surface 212 (shown in FIG. 2) and a lower disk surface 214 (shown in FIG. 2). Each of the original disks 110 can further define a substantially circular outer edge 116 and a substantially circular inner edge 118. In example aspects, the inner edges 118 of the original disks 110 can each define an original disk bore 120 formed through the original disk 110.

As such, when the original disks 110 are arranged in series, as shown, the plurality of original disk bores 120 can define an elongated vertical disk stack inner bore 150 formed through a center of the disk stack 100 from the top end 132 to the bottom end 134, such that the top end 132 can define an open top end 132 and the bottom end 134 can define an open bottom end 134. As shown, a disk stack axis 152 can extend centrally through the disk stack inner bore 150. In some aspects, the original disk bores 120 of the original disks 110 can be formed therethrough before the original disks 110 are assembled together to define the disk stack 100. However, in other aspects, the original disks 110 may not comprise the original disk bores 120 when joined together to define the disk stack 100, and the disk stack inner bore 150 of the disk stack 100 can be drilled through the assembled original disks 110 of the disk stack 100.

According to example aspects, the circular inner edges 118 of the original disks 110 can define an inner surface 160 of the disk stack 100, as shown. The inner surface 160 can be substantially cylindrical in shape and can define an inner diameter $D_1$ and an inner circumference of the disk stack 100. Furthermore, the circular outer edges 116 of the original disks 110 can define an outer surface 170 of the disk stack 100, as shown. The outer surface 170 can be substantially cylindrical in shape and can define an outer diameter $D_2$ that can be greater than the inner diameter $D_1$ of the disk stack 100 and an outer circumference that can be greater than the inner circumference of the disk stack 100. Furthermore, according to various example aspects, the original disks 110 can be formed from a metal material, such as, for example, stainless steel. In other aspects, the original disks 110 can comprise any other suitably durable material known in the art, including, but not limited to, an Inconel® alloy, such as Inconel® 718, Inconel® 625, or Inconel® 440.

According to example aspects, grooves 165 (shown in FIG. 1B) can be machined into each of the original disks 110, which, when the original disks 110 are stacked as shown, can define the fluid passageways 175 in the disk stack 100. For example, in the present aspect, the grooves 165 can define a first groove pattern 620 (shown in FIG. 6) formed on the upper disk surface 212 of each of the original disks 110 and a second groove pattern 720 (shown in FIG. 7) formed on the lower disk surface 214 of each of the original disks 110. According to various example aspects, the first and second groove patterns 620,720 can be formed on the corresponding original disks 110 by electrical discharge machining (EDM); however, in other aspects, the grooves 165 can be formed by any other suitable type of machining, including, but not limited to, milling, casting, additive manufacturing (i.e., 3D printing), and the like. The original disks 100 can be stacked such that the upper disk surface 212 of each original disk 110 abuts the lower disk surface 214 of an adjacent original disk 110.

As such, each of the first groove patterns 620 can be configured to abut an adjacent second groove pattern 720 to define one or more of the fluid passageways 175 therebetween. In the present aspect, a plurality of fluid passageways 175 can be formed between adjacent pairs of original disks 110. Each of the fluid passageways 175 can extend from the inner surface 160 of the disk stack 100 to the outer surface 170 of the disk stack 100 and can define one or more bends and/or turns, such as, for example, a series of 90° turns. According to example aspects, fluid can enter the disk stack inner bore 150 through the inlet end 104 of the disk stack 100. The fluid can then flow into the fluid passageways 175 at passageway inlet openings 176 formed at the inner surface 160 of the disk stack 100 and can flow out of the fluid passageways 175 at passageway outlet openings 178 at the outer surface 170 of the disk stack 100. In one example aspect of a fluid passageway 175, a first groove of the first groove pattern 620 of a first original disk 110a can define the passageway inlet opening 176 of the fluid passageway 175. Fluid can flow into the first groove of the first original disk 110a and can be guided around a turn or bend into a second groove of the second groove pattern 720 of an adjacent second original disk 110b. The fluid can then be guided around another turn or bend into a third groove of the first groove pattern 620 of the first original disk 110a, and so on, until the fluid exits the fluid passageway 175 through the corresponding passageway outlet opening 178. As the fluid is dispersed into the fluid passageways 175 and moves through series of turns defined therein, the velocity and pressure of the fluid can be reduced, as described in further detail below.

Figure 1B:
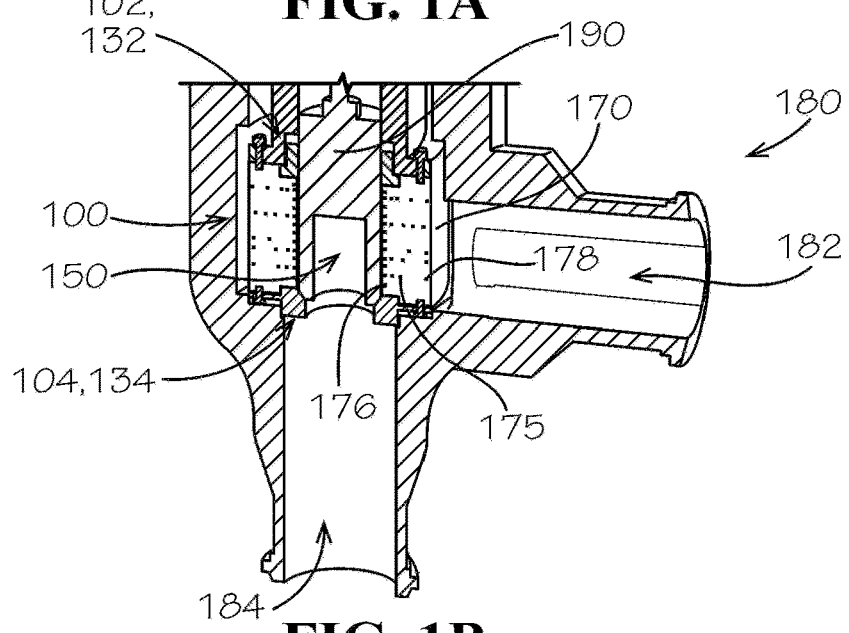
FIG. 1B is a cross-sectional view of the disk stack of FIG. 1A, taken along line 1-1 of FIG. 1A, wherein the disk stack is positioned within a valve assembly.

Referring to FIG. 1B, a valve assembly 180 comprising the disk stack 100 can have the disk stack 100 mounted therein, such that one end of the disk stack 100, such as the inlet end 104 (e.g., the bottom end 134), faces an inlet 184 of the valve assembly 180. The other end of the disk stack 100, such as the plugged end 102 (e.g., the top end 132), can be, in some aspects, plugged with a movable plug 190 that can move through the disk stack inner bore 150 to control fluid flow from the inlet 184 of the valve assembly into the disk stack 100 to the fluid passageways 175 by selectively covering and uncovering the passageway inlet openings 176 of the fluid passageways 175 as the plug 190 moves within the disk stack inner bore 150. Fluid can then exit the fluid passageways 175 through the passageway outlet openings 178 formed at the outer surface 170 of the disk stack 100 to an outlet 182 of the valve assembly 180. As the fluid moves through the fluid passageways 175 from the disk stack inner bore 150 to the outer surface 170, both the fluid and its energy can be dissipated such that an exit pressure of the fluid upon exiting the disk stack 100 can be less than an entrance pressure of the fluid upon entering the disk stack 100. For example, in one aspect, fluid can enter the disk stack 100 at an entrance pressure of about 3000 psi and can exit the disk stack 100 at an exit pressure between about 250 and 300 psi. The lower pressure fluid exiting the disk stack 100 can then be suitable for use in lower pressure applications, thereby protecting downstream valves and other fluid system infrastructure. In other aspects, fluid can enter the disk stack 100 at another entrance pressure and can exit at another exit pressure, provided the exit pressure is less than the entrance pressure.

In other example aspects, the grooves 165 and fluid passageways 175 may be alternatively formed. For example, in a first alternate aspect, some or all of the fluid passageways 175 may defined in a single original disk 110, as opposed to being defined between a pair of the adjacent original disks 110, as shown in the present aspect. In other aspects, some or all of the fluid passageways 175 can vary in shape and/or length. Furthermore, the number of fluid passageways 175 formed in the disk stack 100 can vary, and the number of fluid passageways 175 may even vary between the original disks 110. In still other aspects, not all of the original disks 110 of the disk stack 100 define the grooves 165 fluid passageways 175. As such, it can be seen that the configuration of fluid passageways can be varied in different aspects of the disk stack 100 to provide the desired reduction in velocity and pressure of fluid flowing therethrough.

Figure 2:
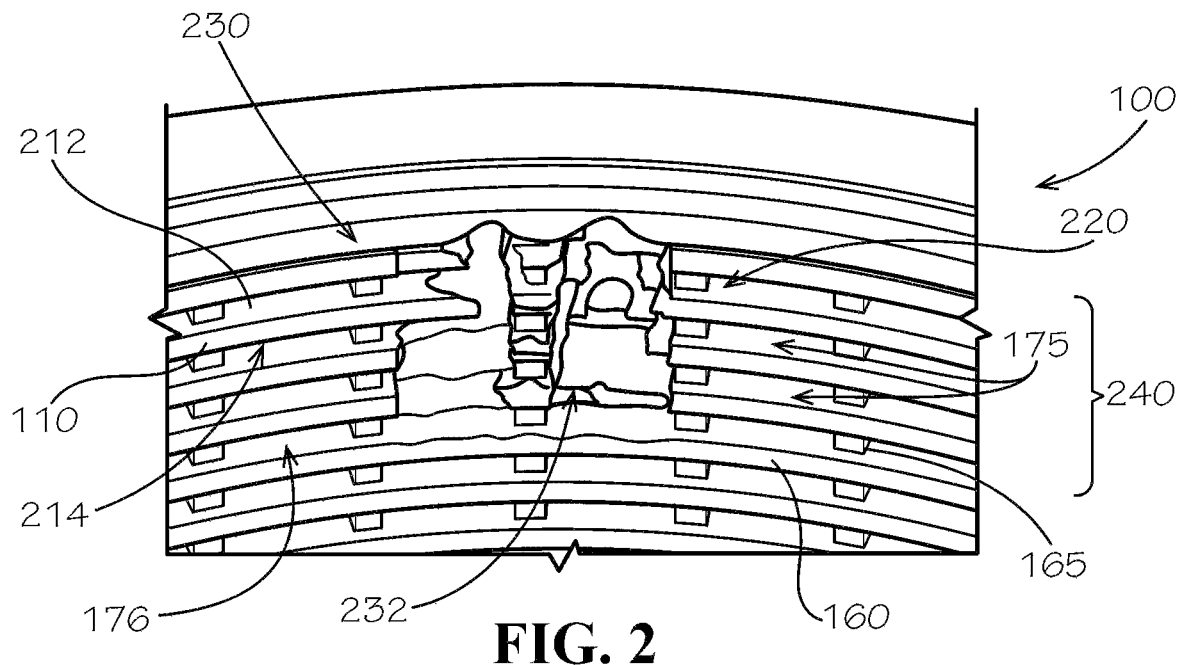
FIG. 2 is a perspective view of a damaged region of the disk stack of FIG. 1A.

In some instances, the high entrance pressure of the fluid upon entering the disk stack 100 can undesirably damage the disk stack 100. For example, FIG. 2 illustrates the disk stack 100 comprising a damaged region 220 caused by high-pressure and high-temperature fluid. As shown, the damaged region 220 can define a defect 230, such as a hole 232, extending from the inner surface 160 of the disk stack 100 to the outer surface 170 (shown in FIG. 1A). The original disks 110 damaged by the defect 230 can be considered affected disks 240. In example aspects, the defect 230 can mar the grooves 165 formed in the original disks 110, and thus can interrupt the fluid passageways 175 and can reduce the effectiveness of the disk stack 100 at decreasing the pressure of the fluid traveling therethrough, such as by blocking some of the fluid passageways 175. In other aspects, the defect 230 may not extend fully through the disk stack 100 from the inner surface 160 to the outer surface 170, but can still damage the grooves 165 formed in the original disks 110 and interrupt the fluid passageways 175 formed by the grooves 165. As such, the disk stack 100 must be repaired or replaced to continue effective operation.

Figure 3:
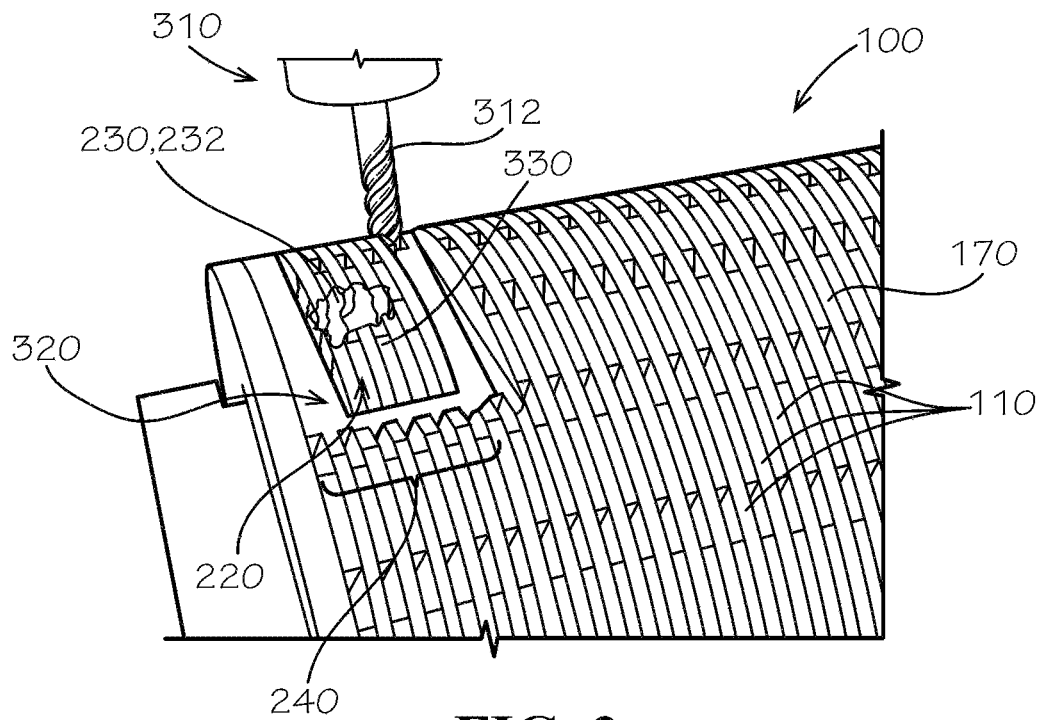
FIG. 3 is a perspective view of the damaged region of FIG. 2 being removed from the disk stack of FIG. 1A.

FIG. 3 illustrates an example method for removing the damaged region 220 from the disk stack 100 so that the disk stack 100 can be repaired. The damaged region 220 can be removed from the disk stack 100 by first cutting around the damaged region 220 and then removing the material within the cut. For example, as shown, in one aspect, the cut can be formed by a tool 310, such as, for example, a drill 312. In other aspects, the cut can be formed by any other suitable cutting methods. In the present aspect, the tool 310 can engage the disk stack 100 at the outer surface 170 thereof and can cut fully through the disk stack 100 to the inner surface 160 (shown in FIG. 1A). The tool 310 can then be moved around a periphery of the damaged region 220 to drill an encircling cut 320 entirely around the hole 232 or other defect 230. For example, the tool 310 can be manually moved by a human operator or can be automatically moved by a machine, or can be operated in any other suitable fashion. As such, the affected disks 240 can comprise any original disk 110 damaged by the defect 230 and/or that is cut by the drill 312. The encircling cut 320 can define a removable section 330 of the disk stack 100 comprising the entire damaged region 220, which can be removed from the disk stack 100. For example, the removable section 330 can be removed manually, by a machine, or in any other suitable fashion. In some aspects, a clearance can be provided between the hole 232 or other defect 230 and the encircling cut 320 to ensure that the entire defect 230, including damage that may not be visible, is encompassed within the removable section 330. In one aspect, damage that may not be visible can include, for example, weakened areas of the disk stack 100 surrounding the defect 230. For example, in a particular aspect wherein the hole 232 or other defect 230 can generally define a length of about 4 inches, the removable section 330 can define a length of about 8 inches, providing a clearance of about 2 inches on either side of the hole 232.

Figure 4:
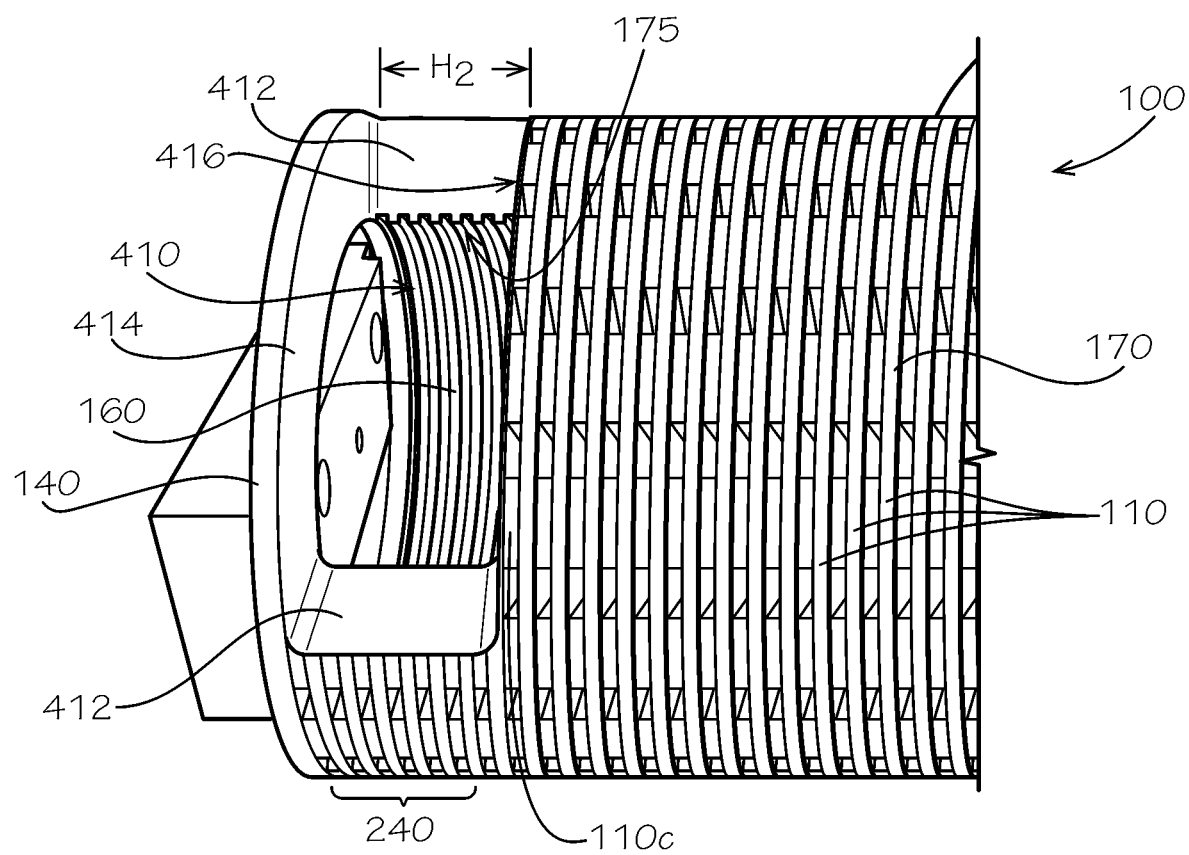
FIG. 4 is a front view of the disk stack of FIG. 1A with the damaged region of FIG. 2 removed.

As shown in FIG. 4, an insert opening 410 can be formed in the disk stack 100 where the removable section 330 (shown in FIG. 3) has been removed. Example aspects of the insert opening 410 can be defined by a pair of opposing boundary sidewalls 412, an upper boundary wall 414, and a lower boundary wall 416, as shown. According to example aspects, the affected disks 240 can terminate at the boundary sidewalls 412. Optionally, as shown in the present aspect, the encircling cut 320 (shown in FIG. 3) can be made such that the boundary sidewalls 412 are solid and do not intersect any of the grooves 165 (shown in FIG. 1B) formed in the affected disks 240. As shown, in the present aspect, the upper boundary wall 414 can be formed by the top disk cap 140. Moreover, in the present aspect, the lower boundary wall 416 can be formed by the upper disk surface 212 (shown in FIG. 2) of an uppermost one of the original disks 110c. As such, the lower boundary wall 416 can define the first groove pattern 620 (shown in FIG. 6). According to example aspects, the insert opening 410 can be configured to receive a disk stack repair insert 800 (shown in FIG. 8) therein to repair the disk stack 100 and restore the fluid passageways 175 of the affected disks 240 to their original configuration, as will be described in further detail below. In some aspects, as shown, the boundary wall(s) 412 can define a substantially smooth surface, which can allow for easy insertion of the disk stack repair insert 800 into the insert opening 410 and sealing of disk stack repair insert 800 with the disk stack 100, as will also be described in further detail below.

In some aspects, the size (e.g., length, width, etc.) of the insert opening 410 can be a function of the size of the disk stack 100. For example, in the present aspect, the length of the insert opening 410 can be about ⅓ of the length of the disk stack 100. That is to say, an arc length of the insert opening 410 at the inner surface 160 of the disk stack 100 can be about ⅓ of the inner circumference of the disk stack 100. Furthermore, an arc length of the insert opening 410 at the outer surface 170 of the disk stack 100 can be about ⅓ of the outer circumference of the disk stack 100. Moreover, in the present aspect, a height $H_2$ of the insert opening 410 can be about ⅙ of the height $H_1$ (shown in FIG. 1A) of the disk stack 100. For example, in one aspect, the disk stack 100 can comprise thirty six original disks 110, six of which can be affected disks 240. The height $H_2$ of the insert opening 410 can span the six affected disks 240. As such, aspects wherein the size of the insert opening 410 is a function of the size of the disk stack 100 can make it easy to determine the size the disk stack repair insert 800 needed to fit seamlessly within the insert opening 410. However, in other aspects, the size of the insert opening 410 may not be a function of the size of the disk stack 100, and the dimensions of the insert opening 410 can simply be measured to determine the size of the disk stack repair insert 800 needed.

Figure 5:
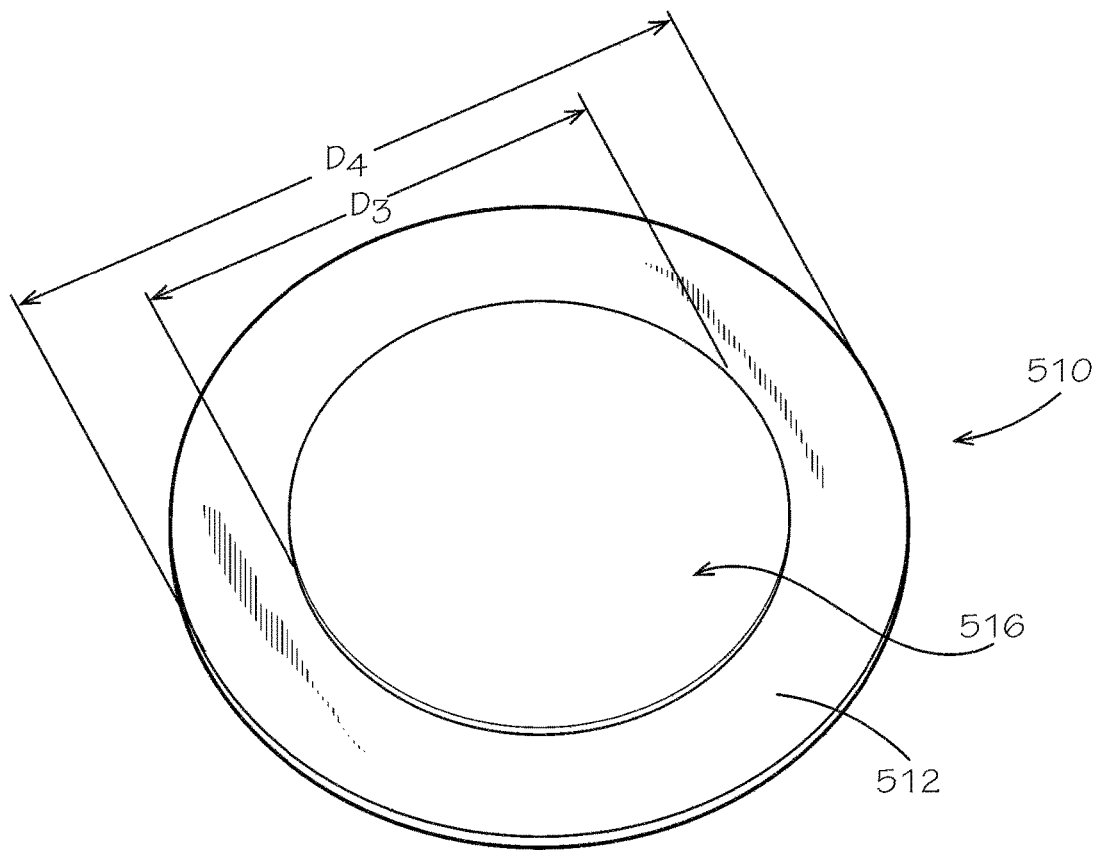
FIG. 5 is a perspective view of a primary replacement disk.

FIG. 5 illustrates an example aspect of a replacement disk, for example, a primary replacement disk 510. Similar to the original disks 110 (shown in FIG. 1A), example aspects of the primary replacement disk 510 can define a lower replacement disk surface 714 (shown in FIG. 7) and an upper replacement disk surface 512. The primary replacement disk 510 can further define a substantially circular cross-sectional shape and a replacement disk bore 516 formed through a center thereof. In example aspects, the primary replacement disk 510 can be formed from a metal material, such as, for example, stainless steel. However, in other aspects, the primary replacement disk 510 can be formed from any other suitably durable material. Furthermore, in some aspects, the primary replacement disk 510 can be formed from the same material as the original disks 110 of the disk stack 100 (shown in FIG. 1A), while in other aspects, the primary replacement disk 510 can be formed from a different material. As shown, example aspects of the primary replacement disk 510 can define a primary replacement disk outer diameter $D_4$ and a primary replacement disk outer circumference that can be larger than the outer diameter $D_2$ and outer circumference of the disk stack 100, respectively. The primary replacement disk 510 can also define a primary replacement disk inner diameter $D_3$ and a primary replacement disk inner circumference that can be smaller than the inner diameter $D_1$ and inner circumference of the disk stack 100, respectively. In other aspects however, the primary replacement disk inner and outer diameters $D_3, D_4$ and circumference can be about equal to the inner and outer diameters $D_1, D_2$ and circumference of the disk stack 100, respectively.

Figure 6:
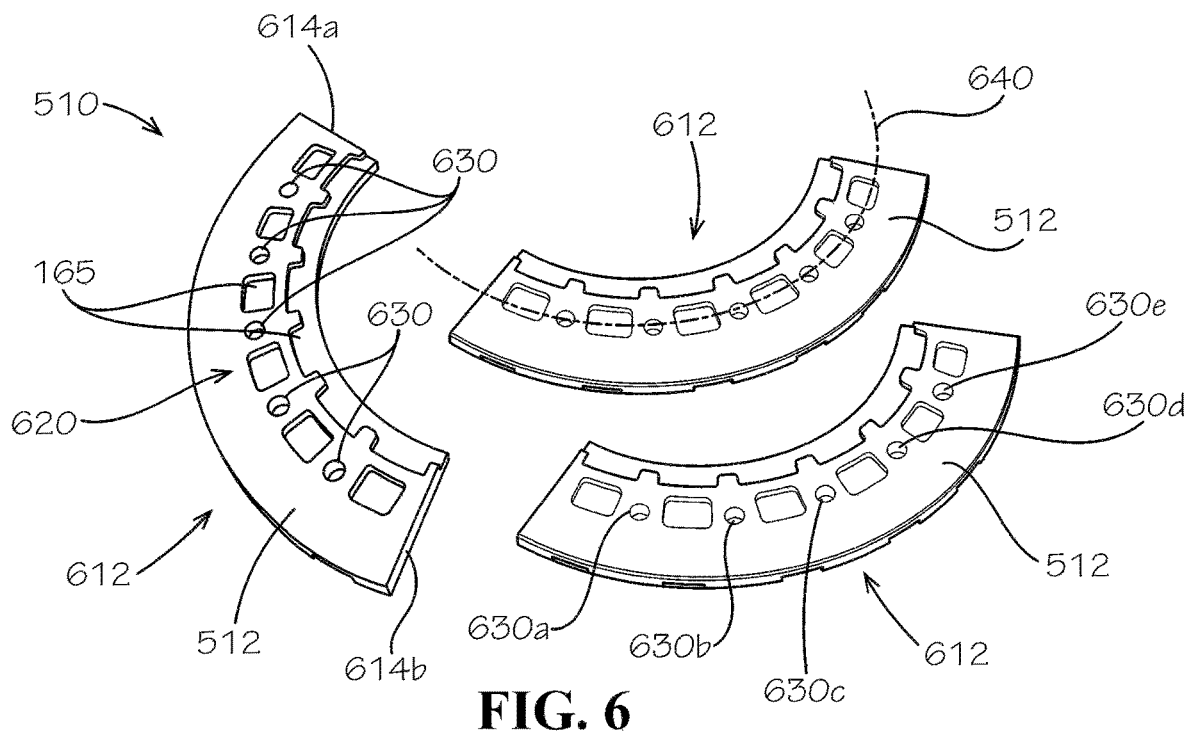
FIG. 6 is a perspective view of the primary replacement disk of FIG. 5 cut into three primary replacement disk segments.

As shown in FIG. 6, the grooves 165 can be machined into the primary replacement disk 510 in the same manner that the grooves 165 were machined into the original disks 110 (shown in FIG. 1A), for example, by electrical discharge machining. For example, in the present aspect, the first groove pattern 620 can be machined into the upper replacement disk surface 512 and the second groove pattern 720 (shown in FIG. 7) can be machined into the lower replacement disk surface 714 (shown in FIG. 7). As such, the grooves 165 formed in the primary replacement disk(s) 510 can match the grooves 165 formed in the original disks 110 of the disk stack 100 (shown in FIG. 1A). That is to say, in the present aspect, the first groove pattern 620 formed in the upper replacement disk surface 512 of the primary replacement disk 510 can match the first groove pattern 620 formed in the upper disk surface 212 (shown in FIG. 2) of each original disk 110, and the second groove pattern 720 formed in the lower replacement disk surface 714 of the primary replacement disk 510 can match the second groove pattern 720 formed in the lower disk surface 214 (shown in FIG. 2) of each original disk 110. In other aspects, the primary replacement disk 510 can define any other suitable groove pattern, and may or may not be configured to match the grooves 165 formed in the original disks 110.

Furthermore, as shown, the primary replacement disk 510 can be sectioned into a plurality of primary replacement disk segments 612. For example, in the present aspect, because the length of the insert opening 410 (shown in FIG. 4) in the disk stack 100 is about ⅓ the length of the disk stack 100, the primary replacement disk 510 can be sectioned into thirds, i.e., into three primary replacement disk segments 612. As such, each of the primary replacement disk segments 612 can be dimensioned lengthwise to fit seamlessly within the insert opening 410, as will be described in further detail below. However, in other aspects, the primary replacement disk 510 can be sectioned into more or fewer primary replacement disk segments 612 as needed, depending upon the size of the insert opening 410 within which the primary replacement disk segments 612 will be received. According to the present aspect, the three primary replacement disk segments 612 can be configured to fix three of the affected disks 240 (shown in FIG. 2).

Moreover, the primary replacement disk 510 can be sectioned into the primary replacement disk segments 612 at locations that do not intersect the grooves 165 formed in the primary replacement disk 510. As such, as shown, a pair of opposing edges 614a,b of each of the primary replacement disk segments 612 can be configured such that they are solid and do not intersect the grooves 165 formed therein. That is to say, the first groove pattern 620 formed in the upper replacement disk surface 512 and the second groove pattern 720 (shown in FIG. 7) formed in the lower replacement disk surface 714 (shown in FIG. 7) of each of the primary replacement disk segments 612 do not intersect with, and therefore are not interrupted by, the opposing edges 614a,b of the corresponding primary replacement disk segment 612. Furthermore, as described above, the boundary sidewalls 412 (shown in FIG. 4) of the insert opening 410 (shown in FIG. 4) can be configured such that they do not intersect any of the grooves 165 formed in the affected disks 240 (shown in FIG. 2). This configuration can eliminate the difficulty of having to align grooves 165 at the edges 614a,b of the replacement disks 612 with grooves 165 at the boundary sidewalls 412. In other aspects, however, there may not be a primary replacement disk 510 that is sectioned into the primary replacement disk segments 612; rather, each of the primary replacement disk segments 612 can be formed independently from one another by any suitable manufacturing process, including, but not limited to, casting, 3D printing, and the like.

Moreover, according to example aspects, one or more alignment holes 630 can be formed through each of the three primary replacement disk segments 612, as shown. For example, in the present aspect, each of the primary replacement disk segments 612 can comprise five alignment holes 630a-e equally spaced apart generally along an arcuate centerline 640 of the corresponding primary replacement disk segment 612. However, other aspects of the primary replacement disk segments 612 can define more or fewer alignment holes 630 therethrough. Furthermore, in other aspects, some or all of the alignment holes 630 may not be oriented at the arcuate centerline 640 of the corresponding primary replacement disk segment 612 and/or may not be equally spaced.

Figure 7:
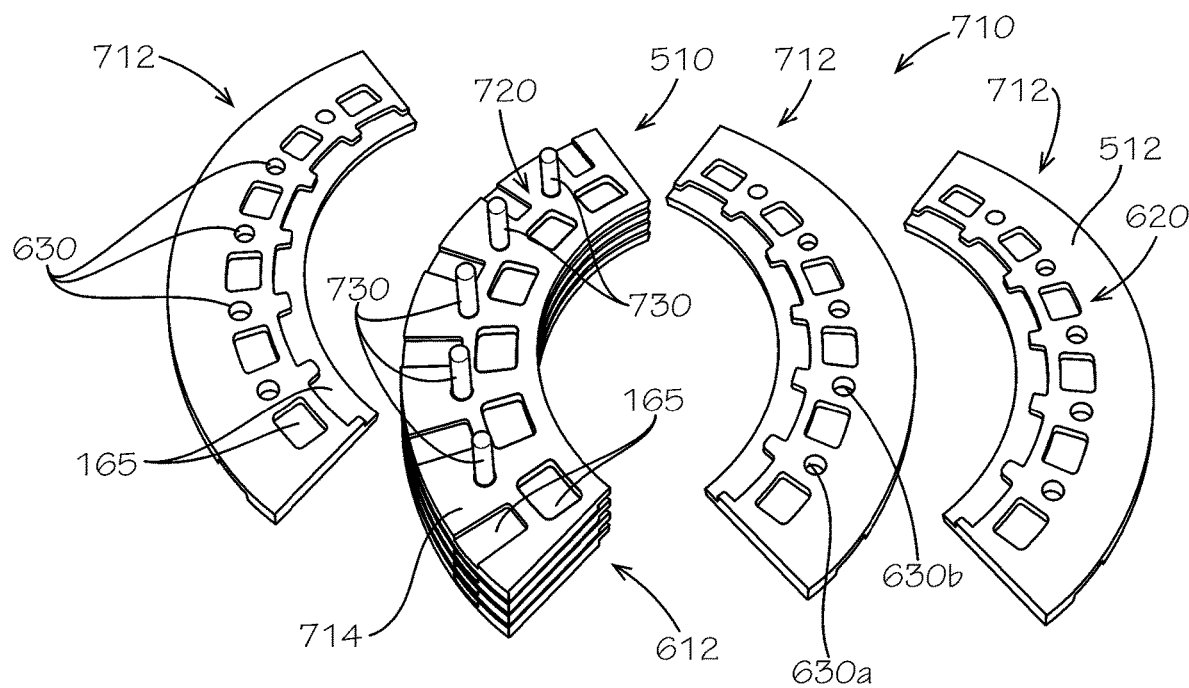
FIG. 7 is a perspective view illustrating the primary replacement disk segments of FIG. 6 and a plurality of secondary replacement disk segments being assembled into a disk stack repair insert.

Referring to FIG. 7, as shown, a secondary replacement disk 710 can also be provided. The secondary replacement disk 710 can be substantially similar to the primary replacement disk 510, defining the first groove pattern 620 (shown in FIG. 6) on the upper replacement disk surface 512 thereof and defining the second groove pattern 720 on the lower replacement disk surface 714 thereof. As such, the grooves 165 of the secondary replacement disk 710 can match the grooves 165 of each original disk 110. As shown, the secondary replacement disk 710 can be sectioned into three secondary replacement disk segments 712, and each of the secondary replacement disk segments 712 can define the alignment holes 630 arranged in the same manner as the alignment holes 630 of the primary replacement disk segments 612. The plurality of primary replacement disk segments 612 and secondary replacement disk segments 712 can be stacked in series and joined together to form the disk stack repair insert 800 (shown in FIG. 8).

According to example aspects, the primary replacement disk segments 612 and secondary replacement disk segments 712 can be stacked in the same arrangement as the original disks 110 of the disk stack 100, wherein each of the upper replacement disk surfaces 512 defining the first groove pattern 620 can abut a lower replacement disk surface 714 defining the second groove pattern 720 of an adjacent primary or secondary replacement disk segment 612,712. As such, in this configuration, the stacking arrangement of the disk stack repair insert 800 (shown in FIG. 8) can be configured to correspond with the stacking arrangement of the disk stack 100 (shown in FIG. 1A), and the fluid passageways 175 can be defined between the adjacent pairs of replacement disk segments 612,712 as described above. In the present aspect, the three primary replacement disk segments 612 can be stacked together first, followed by the three secondary replacement disk segments 712. In other aspects, the primary and secondary replacement disk segments can be stacked together in any other suitable configuration. Furthermore, as many replacement disk segments as needed can be stacked together to replicate the removable section 330 (shown in FIG. 3) that has been removed from the disk stack 100, such that the resulting disk stack repair insert 800 can fit seamlessly within the insert opening 410 (shown in FIG. 4).

According to example aspects, when stacked in configuration described above, the alignment holes 630 of each primary and secondary replacement disk segment 612,712 can align with the corresponding alignment holes 630 of the other primary and secondary replacement disk segments 612,712. For example, all of the alignment holes 630a can be in alignment, all of the alignment holes 630b can be in alignment, and so on. Moreover, according to example aspects, an alignment pin 730 can be received through each set of corresponding alignment holes 630 to properly orient the primary and secondary replacement disk segments 612, 712 in the stacked configuration. In some aspects, the alignment pins 730 can be inserted through the corresponding alignment holes 630 as the primary and secondary replacement disk segments 612,712 are being stacked, as shown. However, in other aspects, the alignment pins 730 can be inserted through the corresponding alignment holes 630 after the primary and secondary replacement disk segments 612,712 are oriented in the stacked configuration. According to example aspects, the alignment holes 630 can be positioned on the replacement disk segments 612,712 between the grooves 165 to avoid interruption of the fluid passageways 175 formed therebetween and to ensure continuous contact of the replacement disk segments 612,712 with the alignment pins 730.

Figure 8:
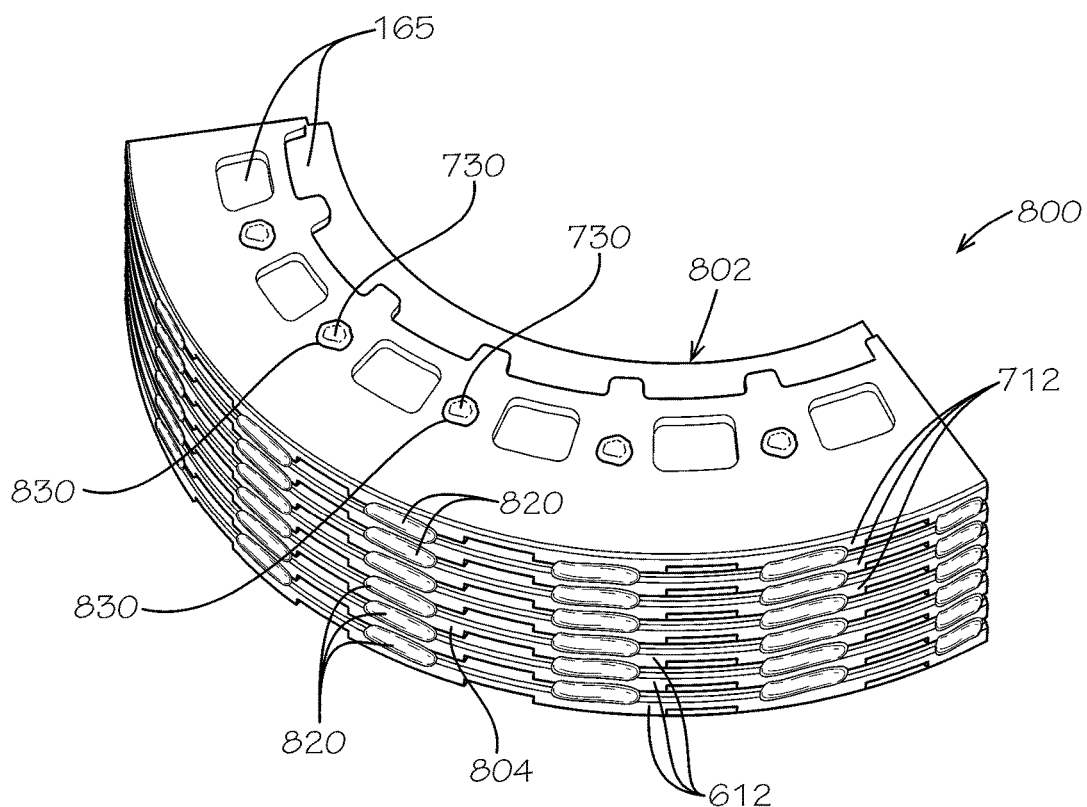
FIG. 8 is a perspective view of the disk stack repair insert of FIG. 7 in an assembled configuration.

FIG. 8 illustrates the assembled disk stack repair insert 800. Once that primary and secondary replacement disk segments 612,712, along with any other replacement disk segments needed, have been stacked to replicate the removable section 330 (shown in FIG. 3), each of the primary and secondary replacement disk segments 612,712 can be coupled to the adjacent primary and secondary replacement disk segments 612,712 to secure the primary and secondary replacement disk segments 612,712 in the stacked configuration. For example, the primary and secondary replacement disk segments 612,712 segments can be joined together by welding 820, as shown, or by any other suitable fastener, including mechanical fasteners, such as bolts, screws, and the like. Moreover, in example aspects, as shown, some or all of the primary and/or secondary replacement disk segments 612,712 can be coupled to the alignment pins 730 passing through the corresponding alignment holes 630. For example, as shown in the present aspect, the primary and secondary replacement disk segments 712 can be coupled to the alignment pins 730 by welding 830, or any other suitable fastener. When the primary and secondary replacement disk segments 612,712 are stacked together and secured in the stacked orientation, the primary and secondary replacement disk segments 612,712 can together define the disk stack repair insert 800. According to example aspects, the disk stack repair insert 800 can define an arcuate inner insert surface 802 and an arcuate outer insert surface 804, as shown. Fluid can be configured to flow through the fluid passageways 175 (shown in FIG. 1) formed between the adjacent replacement disk segments 612,712 from the inner insert surface 802 of disk stack repair insert 800 to the outer insert surface 804.

Figure 9:
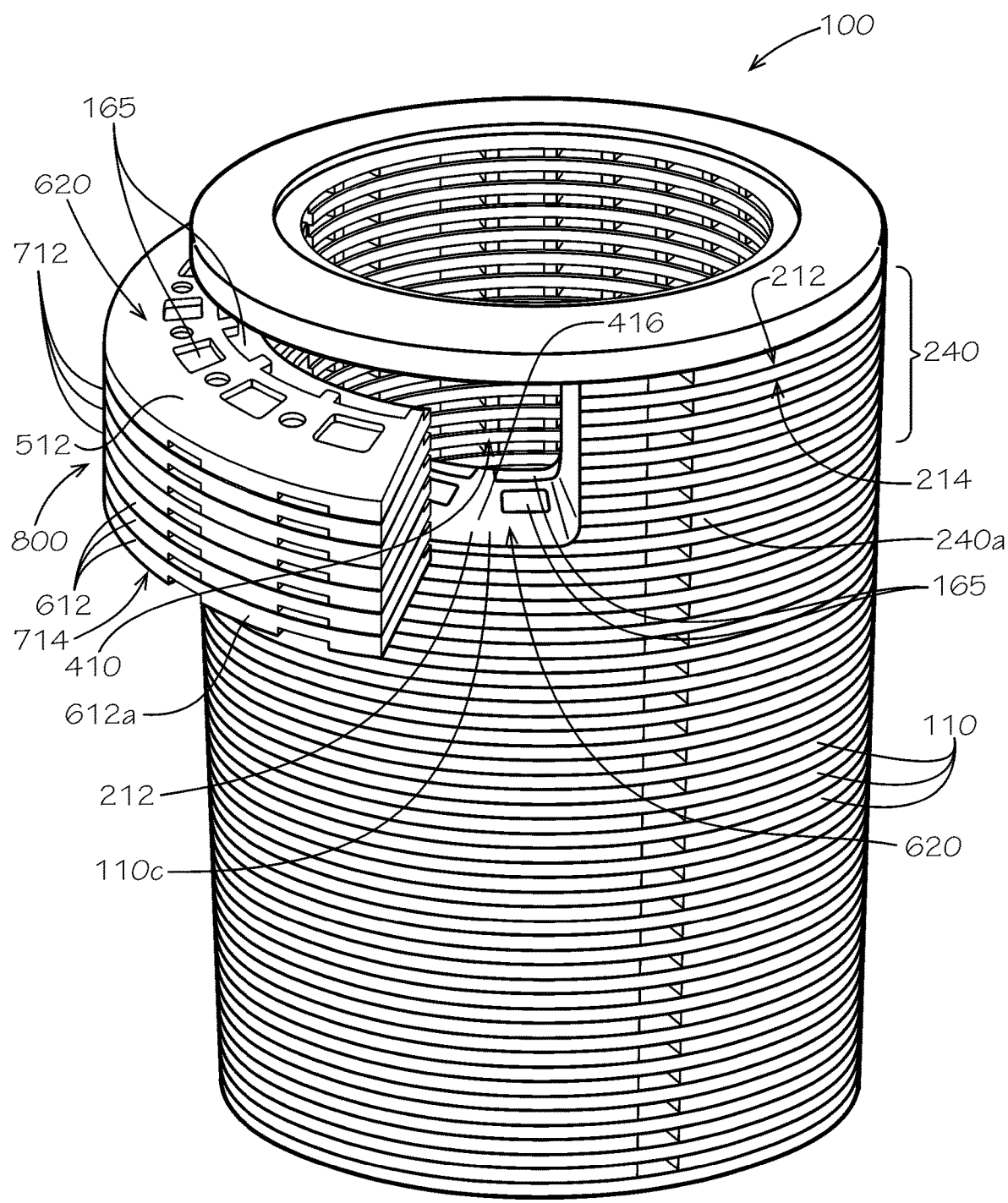
FIG. 9 is a perspective view of the disk stack repair insert of FIG. 7 partially engaged with the disk stack of FIG. 1A.

FIG. 9 illustrates the disk stack repair insert 800 partially inserted into the insert opening 410 of the disk stack 100. According to example aspects, the size and shape of the disk stack repair insert 800 can be substantially similar to the size and shape of the removable section 330 (shown in FIG. 3), such that the disk stack repair insert 800 can fit snugly and seamlessly within the insert opening 410. Moreover, as shown, the number of primary and secondary replacement disk segments 612,712 combined (as well as additional replacement disk segments, if necessary) can correspond to the number of affected disks 240. According to example aspects, the upper replacement disk surface 512 of each replacement disk segment 612,712 can be configured to laterally align with the upper disk surface 212 of a corresponding one of the affected disks 240 to continue the first groove pattern 620 uninterrupted. Furthermore, the lower replacement disk surface 714 of each replacement disk segment 612,712 can be configured to laterally align with the lower disk surfaces 214 of a corresponding one of the affected disks 240 to continue the second groove pattern 720 (shown in FIG. 7) uninterrupted. As such, with the disk stack repair insert 800 positioned in the insert opening 410, the replacement disk segments 612,712 can re-define the original fluid passageways 175 (shown in FIG. 1A) of the disk stack 100 that were interrupted by the defect 230 (shown in FIG. 2) and by the removal of the removable section 330. For example, as shown, a lowermost one of the replacement disk segments 612a can be configured to laterally align with a lowermost one of the affected disks 240a. As such, the lower replacement disk surface 714 of the lowermost replacement disk segment 612 can confront the lower boundary wall 416 of the insert opening 410 (e.g., the upper disk surface 212 of the uppermost original disk 110c). Thus, the first groove pattern 620 of the uppermost original disk 110c can confront the second groove pattern of the lowermost replacement disk segment 612a to re-define the original fluid pathways 175 therebetween.

Figure 10:
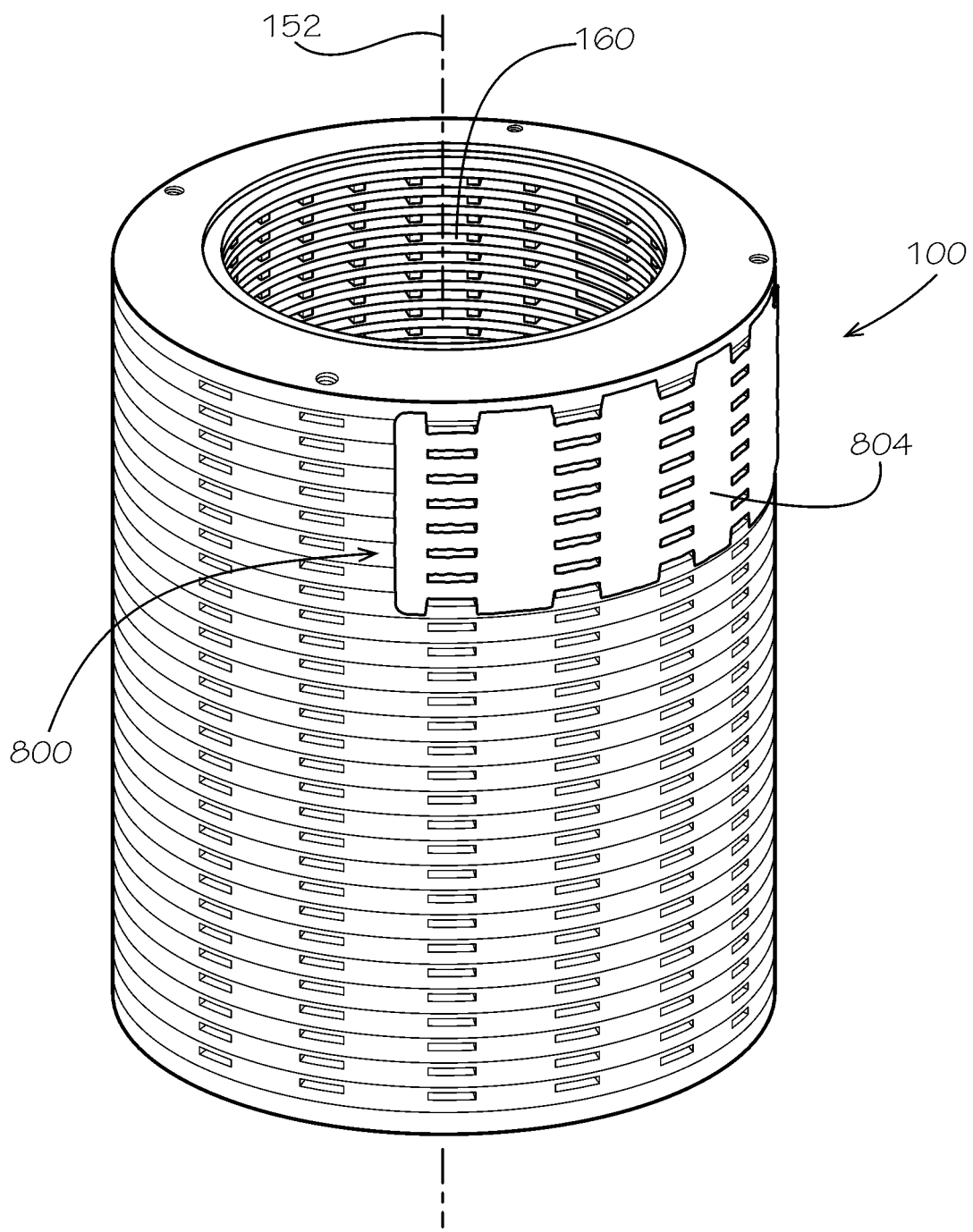
FIG. 10 is a perspective view of the disk stack repair insert of FIG. 7 engaged with the disk stack of FIG. 1A to define a repaired disk stack.

Referring to FIG. 10, as described above, the inner circumference of the primary replacement disk 510 (shown in FIG. 5) can be smaller than the inner circumference of the disk stack 100 and the outer circumference of the primary replacement disk 510 can be greater than the outer circumference of the disk stack 100. The secondary replacement disk 710 can be substantially the same in size as the primary replacement disk 510, and thus can also define an inner circumference and an outer circumference that can be smaller and larger, respectively, than the inner circumference and outer circumference of the disk stack 100. As such, according to example aspects, when the disk stack repair insert 800 is fully received within the insert opening 410 (shown in FIG. 4), as illustrated, the inner insert surface 802 (shown in FIG. 8) of the disk stack repair insert 800 can extend radially inward beyond the inner surface 160 of the disk stack 100, relative to the disk stack axis 152, and the outer insert surface 804 of the disk stack repair insert 800 can extend radially outward beyond the outer surface 170 of the disk stack 100, relative to the disk stack axis 152.

Figure 11:
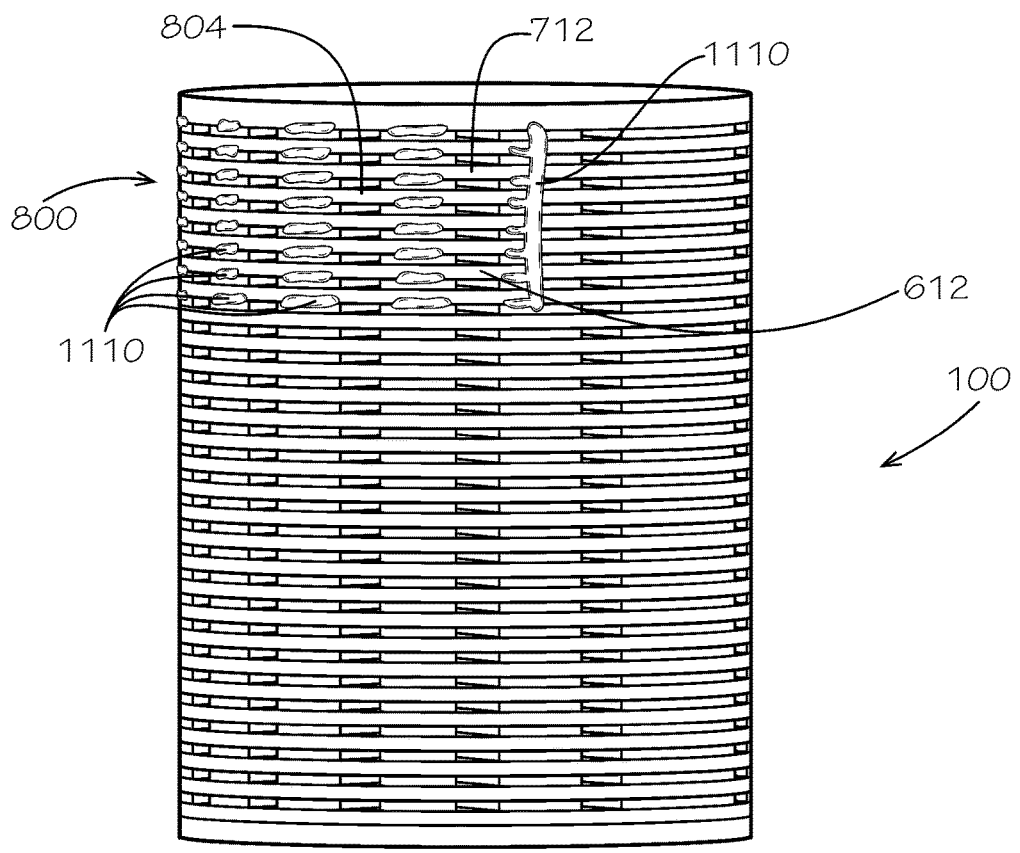
FIG. 11 is a front view of the repaired disk stack of FIG. 10, wherein the disk stack repair insert has been machined to be substantially flush with the disk stack.
Figure 12:
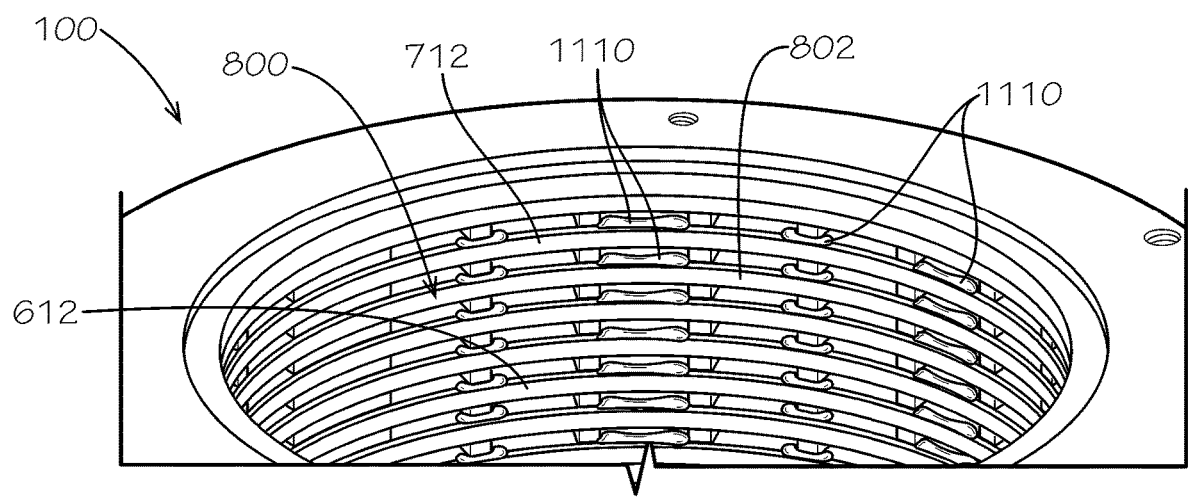
FIG. 12 is a detail view of the repaired disk stack of FIG. 10.

As shown in FIGS. 11 and 12, the inner and outer insert surfaces 802,804 of the disk stack repair insert 800 can then be machined down (for example, sanded), such that the inner and outer circumferences of the primary and secondary replacement disk segments 612,712 can match the inner and outer circumferences of the disk stack 100. As such, the disk stack repair insert 800 can be completely flush with the disk stack 100. Once machined to be flush with the disk stack 100, the disk stack repair insert 800 can then be secured to the disk stack 100, for example, by welding 1110, or by any other suitable fastening methods.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A repaired disk stack comprising:
a disk stack comprising a plurality of original disks joined together in a stacked configuration, the disk stack defining an outer surface defining an outer width and an inner surface defining an inner width that is less than the outer width, a first fluid passageway formed between a pair of adjacent original disks, an insert opening formed laterally through the disk stack from the outer surface to the inner surface; and
a disk stack repair insert positioned in the insert opening, the disk stack repair insert comprising a plurality of replacement disk segments, a second fluid passageway formed between a pair of adjacent replacement disk segments.

2. The repaired disk stack of claim 1, wherein:
a first one of the pair of adjacent replacement disk segments defines a first groove pattern;
a second one of the pair of adjacent replacement disk segments defines a second groove pattern; and
the first groove pattern confronts the second groove pattern to define the second fluid passageway.

3. The repaired disk stack of claim 1, wherein:
the first fluid passageway extends from an inner surface of the disk stack to an outer surface of the disk stack;
the second fluid passageway extends from an inner insert surface of the disk stack repair insert to an outer insert surface of the disk stack repair insert;
fluid is configured to flow through the first fluid passageway from the inner surface to the outer surface; and
fluid is configured to flow through the second fluid passageway from the inner insert surface to the outer insert surface.

4. The repaired disk stack of claim 1, wherein:
the disk stack comprises a pair of solid opposing boundary sidewalls that do not intersect the first fluid passageway;
each of the replacement disk segments defines a pair of solid opposing edges that do not intersect the second fluid passageway; and
each of the solid opposing edges of the of the replacement disk segments abuts a corresponding one of the solid opposing boundary sidewalls of the disk stack.

5. The repaired disk stack of claim 1, wherein the disk stack repair insert fits seamlessly within the insert opening and is sealed with the disk stack by welding.

6. The repaired disk stack of claim 1, wherein the disk stack is a substantially cylindrical disk stack, the original disks are substantially annular original disks, and the disk stack repair insert is a substantially arcuate disk stack repair insert.

7. The repaired disk stack of claim 1, wherein:
each of the original disks defines an original disk bore;
the original disk bores define an elongated disk stack inner bore through a center of the disk stack; and
a disk stack axis extends centrally through the disk stack inner bore.

8. The repaired disk stack of claim 7, further comprising a plug movably positioned within the disk stack inner bore.

9. The repaired disk stack of claim 7, wherein:
an inner insert surface of the disk stack repair insert extends radially inward from an inner surface of the disk stack; and
an outer insert surface of the disk stack repair insert extends radially outward from an outer surface of the disk stack.

10. A repaired disk stack comprising:
a disk stack comprising a plurality of original disks joined together in a stacked configuration, a first fluid passageway formed between a pair of adjacent original disks, an insert opening formed through the disk stack; and
a disk stack repair insert positioned in the insert opening, the disk stack repair insert comprising a plurality of replacement disk segments, a second fluid passageway formed between a pair of adjacent replacement disk segments;
wherein:
a first one of the pair of adjacent replacement disk segments defines a first groove pattern;
a second one of the pair of adjacent replacement disk segments defines a second groove pattern; and
the first groove pattern confronts the second groove pattern to define the second fluid passageway.

11. A repaired disk stack comprising:
a disk stack comprising a plurality of original disks joined together in a stacked configuration, a first fluid passageway formed between a pair of adjacent original disks, an insert opening formed through the disk stack; and
a disk stack repair insert positioned in the insert opening, the disk stack repair insert comprising a plurality of replacement disk segments, a second fluid passageway formed between a pair of adjacent replacement disk segments;
wherein:
the disk stack comprises a pair of solid opposing boundary sidewalls that do not intersect the first fluid passageway;
each of the replacement disk segments defines a pair of solid opposing edges that do not intersect the second fluid passageway; and
each of the solid opposing edges of the of the replacement disk segments abuts a corresponding one of the solid opposing boundary sidewalls of the disk stack.

12. A repaired disk stack comprising:
a disk stack comprising a plurality of original disks joined together in a stacked configuration, a first fluid passageway formed between a pair of adjacent original disks, an insert opening formed through the disk stack; and
a disk stack repair insert positioned in the insert opening, the disk stack repair insert comprising a plurality of replacement disk segments, a second fluid passageway formed between a pair of adjacent replacement disk segments;

wherein:

each of the original disks defines an original disk bore;

the original disk bores define an elongated disk stack inner bore through a center of the disk stack;

a disk stack axis extends centrally through the disk stack inner bore; and the repaired disk stack further comprises a plug movably positioned within the disk stack inner bore.

13. A repaired disk stack comprising:

a disk stack comprising a plurality of original disks joined together in a stacked configuration, a first fluid passageway formed between a pair of adjacent original disks, an insert opening formed through the disk stack; and a disk stack repair insert positioned in the insert opening, the disk stack repair insert comprising a plurality of replacement disk segments, a second fluid passageway formed between a pair of adjacent replacement disk segments;

wherein:

each of the original disks defines an original disk bore;

the original disk bores define an elongated disk stack inner bore through a center of the disk stack;

a disk stack axis extends centrally through the disk stack inner bore;

an inner insert surface of the disk stack repair insert extends radially inward from an inner surface of the disk stack; and an outer insert surface of the disk stack repair insert extends radially outward from an outer surface of the disk stack.

* * * * *